US009502850B2

(12) United States Patent
Funaoka et al.

(10) Patent No.: US 9,502,850 B2
(45) Date of Patent: Nov. 22, 2016

(54) GAS LASER DEVICE

(71) Applicant: MITSUBISHI ELECTRIC CORPORATION, Chiyoda-ku, Tokyo (JP)

(72) Inventors: Kouji Funaoka, Tokyo (JP); Yasunari Matsumoto, Tokyo (JP)

(73) Assignee: MITSUBISHI ELECTRIC CORPORATION, Chiyoda-Ku, Tokyo (KR)

( * ) Notice: Subject to any disclaimer, the term of this patent is extended or adjusted under 35 U.S.C. 154(b) by 0 days.

(21) Appl. No.: 14/759,942

(22) PCT Filed: Mar. 6, 2014

(86) PCT No.: PCT/JP2014/055775
§ 371 (c)(1),
(2) Date: Jul. 9, 2015

(87) PCT Pub. No.: WO2014/156538
PCT Pub. Date: Oct. 2, 2014

(65) Prior Publication Data
US 2015/0357785 A1 Dec. 10, 2015

(30) Foreign Application Priority Data
Mar. 26, 2013 (JP) .................................. 2013-063511

(51) Int. Cl.
*H01S 3/03* (2006.01)
*H01S 3/02* (2006.01)
*H01S 3/038* (2006.01)
*H01S 3/036* (2006.01)
*H01S 3/223* (2006.01)

(52) U.S. Cl.
CPC ................ *H01S 3/02* (2013.01); *H01S 3/036* (2013.01); *H01S 3/038* (2013.01); *H01S 3/2232* (2013.01); *H01S 3/0385* (2013.01)

(58) Field of Classification Search
CPC .................................. H01S 3/03; H01S 3/036
USPC ........................................................... 372/65
See application file for complete search history.

(56) References Cited

U.S. PATENT DOCUMENTS

| 6,493,375 | B1* | 12/2002 | Kodeda ................... H01S 3/086 372/107 |
| 2002/0150138 | A1* | 10/2002 | Pan ......................... H01S 3/036 372/58 |
| 2003/0193985 | A1 | 10/2003 | Hara et al. |
| 2009/0078115 | A1* | 3/2009 | Mori ..................... A63B 39/027 95/19 |
| 2011/0274132 | A1 | 11/2011 | Funaoka et al. |
| 2013/0168401 | A1* | 7/2013 | Avairis ..................... B65D 1/40 220/666 |

FOREIGN PATENT DOCUMENTS

| JP | 60-254680 A | 12/1985 |
| JP | 6-035484 Y2 | 9/1994 |
| JP | 2003-304015 A | 10/2003 |
| JP | 2007-294807 A | 11/2007 |
| JP | 2011-159901 A | 8/2011 |
| WO | WO 2010/134166 A1 | 11/2010 |

OTHER PUBLICATIONS

International Search Report (PCT/ISA/210) mailed on Apr. 8, 2014, by the Japanese Patent Office as the International Searching Authority for International Application No. PCT/JP2014/055775.
Notification of Transmittal of Translation of the International Preliminary Report on Patentability (Forms PCT/IB/338 and PCT/IB/373) and the Written Opinion of the International Searching Authority (Form PCT/ISA/237) issued on Oct. 8, 2015, by the International Bureau of WIPO in corresponding International Application No. PCT/JP2014/055775. (5 pages).

* cited by examiner

*Primary Examiner* — Tod T Van Roy
(74) *Attorney, Agent, or Firm* — Buchanan Ingersoll & Rooney PC

(57) ABSTRACT

A gas laser device includes a housing for enclosing a laser gas. The housing includes a main body having a frame-like structure with openings formed on both sides thereof, and a pair of cover members detachably attached to cover each of the openings. The main body is provided with an upper plate and a lower plate each extending along the optical axis of the laser light, and a pair of side plates respectively connecting both ends of the upper plate and the lower plate. Each of the cover members includes a partially cylindrical member having an arc-like cross-sectional shape in a plane perpendicular to the optical axis and extending along the optical axis, and a pair of side wall members occluding both ends of the partially cylindrical member. The partially cylindrical member has a bellows portion molded into a shape having peaks and valleys each alternating along the optical axis.

7 Claims, 7 Drawing Sheets

VIEW A

VIEW B

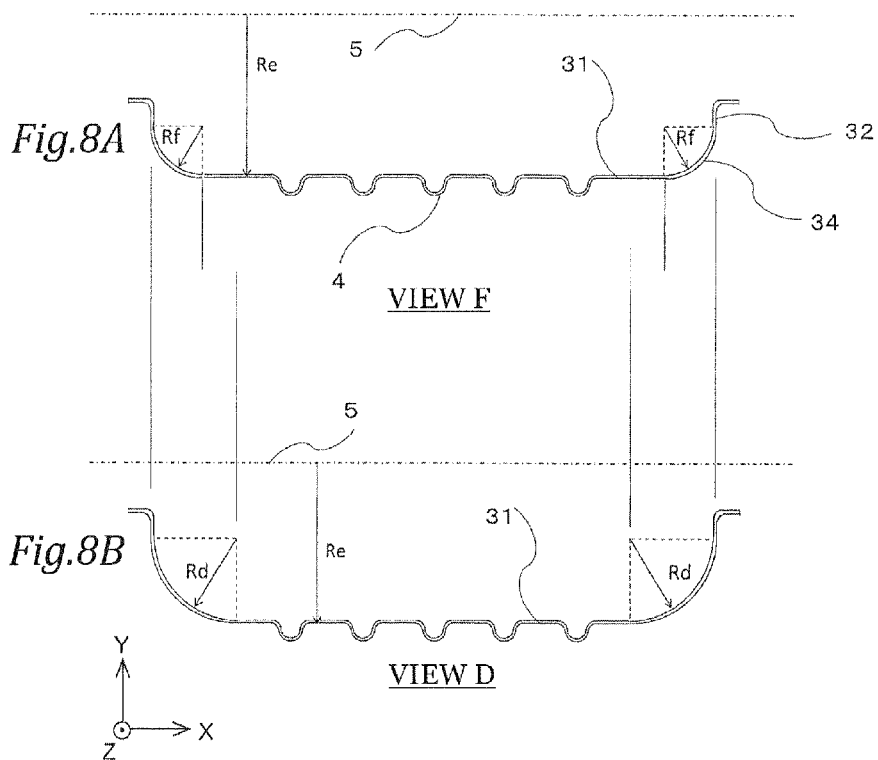
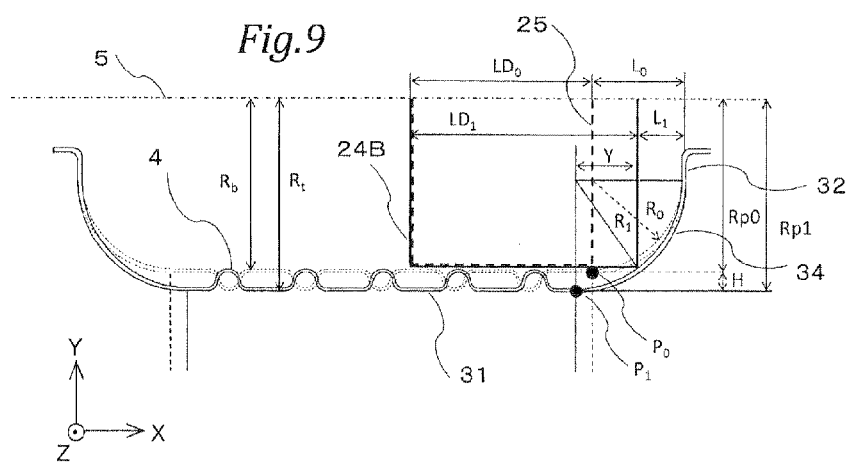

VIEW G

GAS LASER DEVICE

TECHNICAL FIELD

The present invention relates to a gas laser device for performing laser oscillation or laser amplification with a laser medium gas enclosed in a housing having a sealed structure.

BACKGROUND

A conventional orthogonal excitation gas laser device includes a housing having a hermetically sealed structure in which a laser medium gas, such as $CO_2$ gas, is enclosed. The housing is provided with discharging electrodes for discharge exciting the laser medium gas, a heat exchanger for cooling the laser medium gas, and a blower for circulating the laser medium gas. In the continuous oscillation of the gas laser, such as $CO_2$ gas laser, discharge excitation is commonly used for excitation caused by collision of electrons during discharge in order to excite (pump) gas molecules which can emit laser light up to an energy level required for stimulated emission. In this case for ensuring stable discharge, the internal space of the oscillator hosing is required to keep a vacuum state of 30 to 60 Torr. Therefore, the oscillator hosing of the laser oscillator is required to have a hermetic sealing performance capable of keeping the vacuum state.

Further, since regular maintenance is required for the discharging electrodes, the heat exchanger, the blower, mirror optics and the like located within the housing, the heat exchanger, the blower and mirror optics located within the housing, it is desired that maintenance operators can easily access them from the external of the housing. Thus, the housing is commonly provided with a wide opening and a detachable cover member is attached thereto to occlude this opening.

Accordingly, it is desired that the cover member of the gas laser device can withstand a load caused when the interior of the housing is kept in a vacuum state, and can hold a hermetic sealing performance capable of keeping the vacuum state, and can have a wide opening area for easy maintenance of components inside the housing.

For such a cover member of the gas laser device, prior arts propose a plate-like one or a thin-walled structure having a cover member on which a curved surface expanding internally (See, e.g., Patent document 1) or externally (See, e.g., Patent documents 2 and 5) with respect to the housing is formed.

Further, gas laser devices, which are mainly used for laser machining, have been developed to produce higher power for enhancing the machining performance. Thus, longer discharging electrodes, larger heat exchangers and larger gas ducts are introduced, thereby resulting in a lengthened housing especially along the optical axis and enlarged height and width of the housing. Moreover, as the surface area of the enlarged housing is increased, a high atmospheric pressure is applied to the housing and the cover member, hence, which are required to have a higher strength and rigidity.

PRIOR ART DOCUMENT

Patent Document

[Patent Document 1] JP S60-254680 A (FIG. 1)
[Patent Document 2] JP H06-035484 Y (FIG. 1)
[Patent Document 3] JP 2003-304015 A (FIG. 1)
[Patent Document 4] JP 2007-294807 A (FIG. 1)
[Patent Document 5] WO 2010-134166 A (FIG. 1)
[Patent Document 6] JP 2011-159901 A

SUMMARY OF THE INVENTION

Problem to be Solved by the Invention

In the enlarged laser device, the large cover member is required to have a larger thickness of the wall for withstanding the atmospheric pressure. Consequently, material cost of the cover member is increased and workability of maintenance is worsened along with the increased weight.

Further, as the housing is enlarged, it becomes more difficult to ensure flatness of a flange portion of the cover member, resulting in worsened airtightness and increased workload, such as repair of airtightness. Consequently, manufacturing cost is increased.

It is an object of the present invention to provide a gas laser device which can achieve a lightweight and low-cost cover member even when the housing is enlarged.

Means for Solving the Problem

In order to achieve the above-mentioned object, the present invention provides a gas laser device for generating laser light by exciting a laser gas, including a housing for enclosing the laser gas, wherein the housing includes a main body having a frame-like structure with openings formed on both sides thereof, and a pair of cover members detachably attached to cover each of the openings, and the main body is provided with a pair of first frame members each extending along the optical axis of the laser light, and a pair of second frame members respectively connecting both ends of the first frame members, and each of the cover members includes a partially cylindrical member having an arc-like cross-sectional shape in a plane perpendicular to the optical axis and extending along the optical axis, and a pair of side wall members occluding both ends of the partially cylindrical member, and the partially cylindrical member has a bellows portion molded into a shape having peaks and valleys each alternating along the optical axis.

It is preferable in the present invention that the side wall member has a curved portion molded into an arc-like shape, and the partially cylindrical member is connected in a tangential direction of the curved portion.

It is preferable in the present invention that the side wall member is formed only of the curved portion.

It is preferable in the present invention that the radius of curvature of the curved portion varies along the circumferential direction of the partially cylindrical member.

It is preferable in the present invention that the radius of the end portion of the partially cylindrical member is larger than the radius of the valley of the bellows portion.

It is preferable in the present invention that the radius of the end portion of the partially cylindrical member is equal to the radius of the peak of the bellows portion.

It is preferable in the present invention that the cover member has a uniform thickness.

Effect of the Invention

According to the present invention, the partially cylindrical member is provided with a bellows portion molded into a shape having peaks and valleys each alternating along the optical axis, so that buckling strength along the circumferential direction of the partially cylindrical member is improved, hence, a larger and thin-walled cover can be obtained. Consequently, workability is improved and material cost is reduced due to lightweight solution.

Further, since the bellows portion can be elastically deformed along the optical axis, even if warpage occurs during manufacturing the cover member, it can follow a plane to be attached. Therefore, accuracy of dimension can be relaxed and even a larger cover member can be produced at lower cost.

BRIEF DESCRIPTION OF THE DRAWINGS

FIG. 8A is a cross sectional view taken by arrow F along a plane passing through a center line of a partially cylindrical member, and FIG. 8B is a cross sectional view taken by arrow D along X-Y plane passing through the center line of the partially cylindrical member.

FIG. 9 is a cross sectional view taken along X-Y plane passing through a center line of a partially cylindrical member, showing yet another structure of a cover member according to Embodiment 4 of the present invention.

FIG. 11A is a perspective view and FIG. 11B is a cross sectional view taken by arrow G.

EMBODIMENT FOR CARRYING OUT THE INVENTION

Embodiment 1

Figure 1:
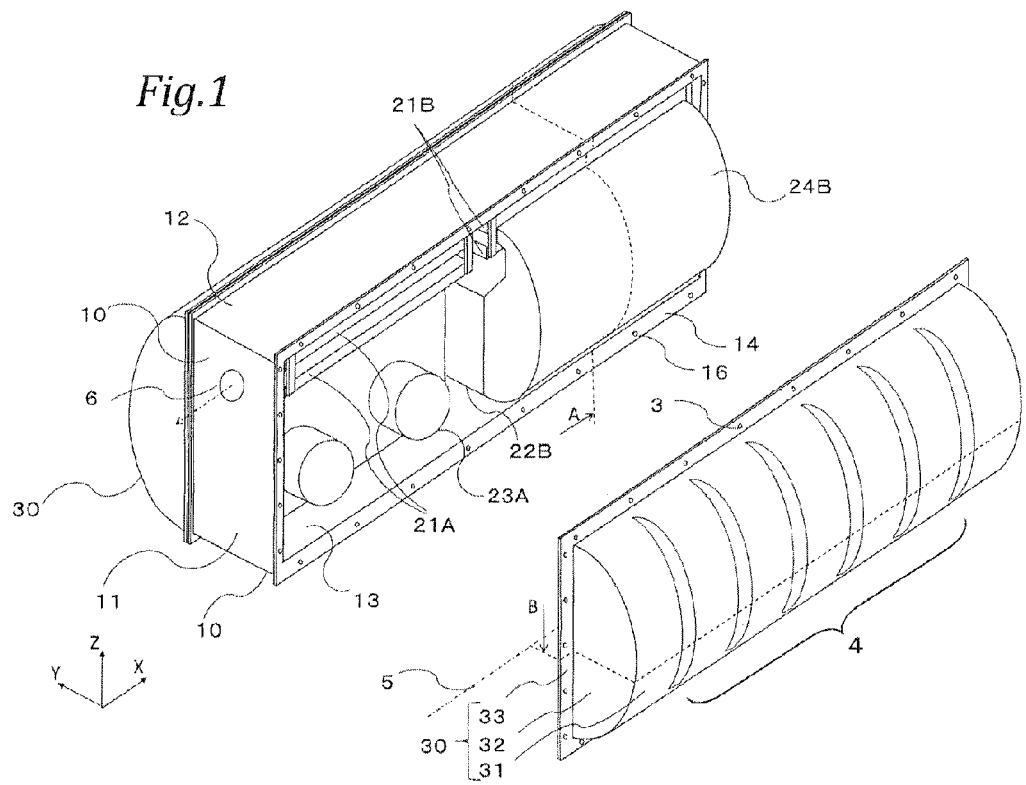
FIG. 1 is a perspective view of a gas laser device according to Embodiment 1 of the present invention, with one of cover members being detached.
Figure 2:
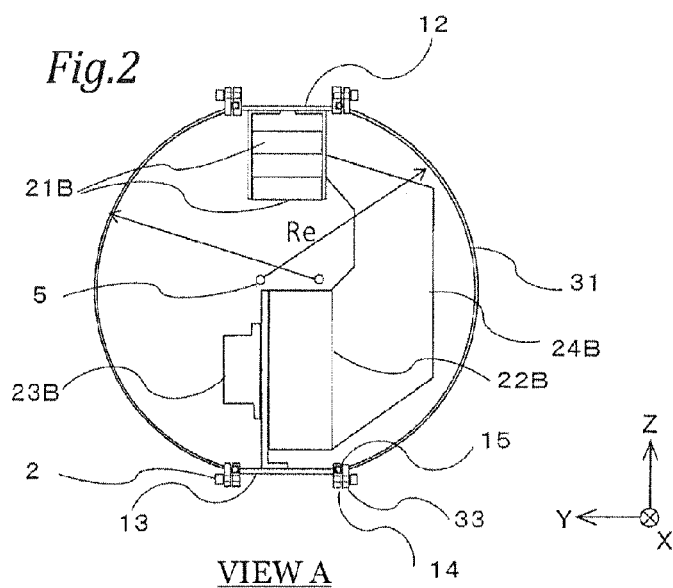
FIG. 2 is a cross sectional view taken by arrow A in FIG. 1.
Figure 3:
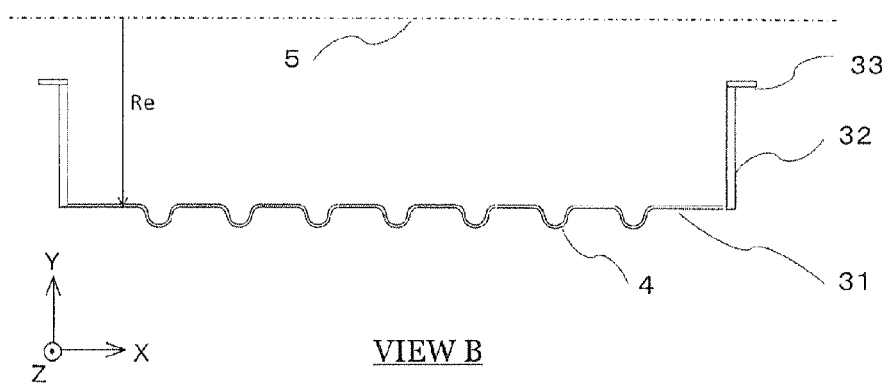
FIG. 3 is a cross sectional view taken by arrow B in FIG. 1.

FIG. 1 is a perspective view of a gas laser device according to Embodiment 1 of the present invention, with one of cover members being detached. FIG. 2 is a cross sectional view taken by arrow A in FIG. 1. FIG. 3 is a cross sectional view taken by arrow B in FIG. 1. Here, for easy understanding, an optical axis of laser light is defined as X direction, a height direction perpendicular to the optical axis is defined as Z direction, and a height direction perpendicular to both X and Z directions is defined as Y direction.

<Structure of Gas Laser Device>

A housing of the gas laser device includes a main body 10 having a frame-like structure with openings formed on both sides thereof, and a pair of cover members 30 detachably attached to cover each of the openings. The former and latter are fixed to each other using a securing member, such as bolt 2, for ensuring a hermetic internal space in which a laser gas is enclosed.

The main body 10 is provided with an upper plate 12 and a lower plate 13 each extending along X direction, and a pair of side plates 11 respectively connecting both ends of the upper plate 12 and the lower plate 13. These side plates 11, upper plate 12 and lower plate 13 constitute a frame-like member. Each of the openings of this frame-like member is provided with flange plates 14 protruding outward in Z-X plane, respectively. On the flange plate 14 an O-ring groove 15 for attaching an O-ring is formed so as to surround the opening. Outside the O-ring groove 15 a plurality of screw holes 16 are formed for fastening the bolt 2.

This main body 10 can be fabricated using metal materials, such as steel, stainless steel, aluminum, by hermetically welding the upper plate 12, the lower plate 13, the side plates 11 and the flange plates 14.

Inside the main body 10 two sets of excitation units in which the laser gas flows in a direction opposite to each other are located. Hereinafter, components for constituting the first excitation unit is referred to as those added by "A", while components for constituting the second excitation unit is referred to as those added by "B".

The first excitation unit includes a pair of discharging electrodes 21A for exciting the laser gas, a blower 23A for circulating the laser gas, a heat exchanger (not shown) for cooling the laser gas, and a gas duct (not shown) for guiding the laser gas supplied by the blower 23A toward the discharging electrodes 21A. In the discharging space of the discharging electrodes 21A, the laser gas is supplied in −Y direction and discharge occurs along Z direction and laser light amplified by the laser gas propagates along X direction, thereby constituting a triaxial orthogonal gas laser device.

The second excitation unit includes a pair of discharging electrodes 21B for exciting the laser gas, a blower 23B for circulating the laser gas, a heat exchanger 22B for cooling the laser gas, and a gas duct 24B for guiding the laser gas supplied by the blower 23B toward the discharging electrodes 21B. In the discharging space of the discharging electrodes 21B, the laser gas is supplied in Y direction and discharge occurs along Z direction and laser light amplified by the laser gas propagates along X direction, thereby constituting a triaxial orthogonal gas laser device.

The optical axis of the laser light passing through the first excitation unit is aligned with the optical axis of the laser light passing through the second excitation unit, and the flow directions of the laser gas with respect to the optical axis are opposite to each other, thereby symmetrizing a total gain distribution which is obtained by superposing gain distributions of the excitation units. Consequently, symmetry of the emitted laser beam can be upgraded.

A partially reflecting mirror 6 and an output window are located at a place where the optical axis of the laser light intersects with one of the side plates 11, and a fully reflecting mirror (not shown) is located at a place where the optical axis of the laser light intersects with other of the side plates 11, thereby realizing a laser oscillator which can generate laser light solely. Further, transmission windows are located at places where the optical axis of the laser light intersects with both of the side plates 11, thereby realizing a laser amplifier which can amplify laser light supplied from outside (See Patent Document 6).

In this embodiment the opening plane of the main body 10 is set to be parallel to the optical axis. Thus, it is easy to fix optical components, such as mirror, inside the main body 10. In addition, when opening the cover during maintenance, the optical components remain stationary. Therefore, work for redoing optical alignment can be omitted.

<Structure of Cover>

The cover member 30 includes a partially cylindrical member 31 having an arc-like cross-sectional shape in Y-Z plane perpendicular to the optical axis and extending along the optical axis, and a pair of side wall members 32 occluding both ends of the partially cylindrical member. Thus, the partially cylindrical member 31 and the side wall members 32 constitute a semi-cylindrical container, an opening of which is provided with a flange plate 33 protruding outward in Z-X plane. The flange plate 33 has a shape suitable to make in contact with the flange plate 14 of the main body 10, and is provided with a plurality of through holes 3 corresponding to the screw holes 16 of the flange plate 14.

This cover member 30 can be fabricated using metal materials, such as steel, stainless steel, aluminum, by hermetically welding the partially cylindrical member 31, the side wall members 32 and the flange plate 33.

In comparison with a structure in which a cover member expands internally into a housing (See, e.g., Patent document 4), this embodiment employs a structure in which the cover member 30 expands externally. Thus, the interior of the externally expanded space can accommodate components protruding from the opening plane of the main body 10, resulting in advantage of downsizing the housing correspondingly.

<Shape of Bellows>

The partially cylindrical member 31, as shown in FIG. 3, has a bellows portion 4 molded into a shape having peaks and valleys each alternating along the optical axis. This bellows portion 4 can be molded integrally with the partially cylindrical member 31 by stamping.

<Pressure Container>

When attaching the cover member 30 to the main body 10, an O-ring is mounted in the O-ring groove 15 of the flange plate 14 of the main body 10, and then this flange plate 14 is made in contact with the flange plate 33 of the cover member 30 and in this state the bolts 2 are inserted into the through holes 3 to be screwed and fastened with the screw holes 16. Thus, the main body 10 and the cover member 30 are connected with each other in a highly hermetic manner, resulting in a pressure container capable of enclosing a laser gas.

The cross section of the housing perpendicular to X direction, as shown in FIG. 2, has a shape in which arc portions each corresponding to the outer walls of the cover member 30 are connected to linear portions each corresponding to the upper plate 12 and the lower plate 13. Incidentally, the cover member 30 can be separated from the main body 10 by releasing the securing member, such as bolt 2, during maintenance.

<Function of Shape of Bellows>

Figure 11A:
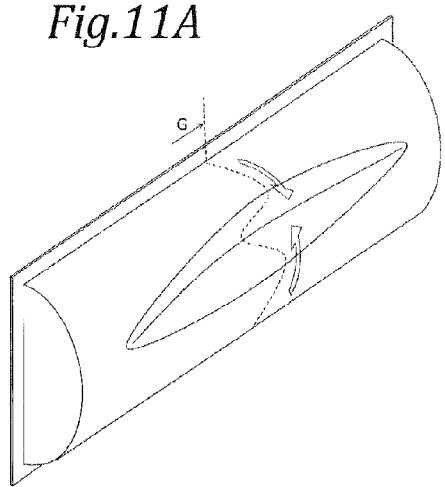
FIGS. 11A and 11B show a state where a partially cylindrical member is buckled.
Figure 11B:
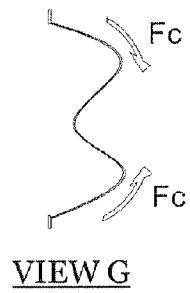

Since no bending stress occurs in principle under atmospheric pressure in the partially cylindrical member 31, the cover member can be remarkably thinned in comparison with a cover made of a flat plate. But recent gas laser devices are increasing in size. If a partially cylindrical portion of a door lacks concavity and convexity (See, e.g., Patent document 2), as shown in FIGS. 11A and 11B, a compressive load Fc occurring in the circumferential direction under atmospheric pressure may enable the partially cylindrical portion to be buckled, deformed or destroyed.

For more details, it is known that as slenderness ratio $\lambda$ (=L/r) which is defined by dividing member length L along a direction in which the compressive load Fc is exerted by radius of gyration r is larger, buckling strength is smaller. In this case the radius of gyration r is defined as a value that is moment of inertia of area I by cross-sectional area A.

As the housing of the gas laser device increases in size, the arc length of the cylindrical portion of the cover, that is, the member length L along a direction in which the large compressive load Fc is exerted is enlarged. As a result, the slenderness ratio $\lambda$ is enlarged, and buckling strength becomes smaller.

Further, in case of a compact laser oscillator having a small length along the optical axis, a pair of side wall members 32 occluding both ends of the partially cylindrical member 31 can work as a reinforcing rib, resulting in a larger buckling strength. Meanwhile, in case of a large size gas laser device, when the partially cylindrical member 31 is lengthened along the optical axis, the buckling strength is lowered because the central part of the cylindrical portion is far away from the side wall members 32 reinforcing the bending rigidity. As a result, as shown in FIGS. 11A and 11B, the central part of the cylindrical portion is likely to buckle. In order to enhance the buckling strength, some countermeasures, such as welding reinforcing ribs or thickening the plate thickness, are required. Consequently, manufacturing cost is increased and maintenance is more difficult along with the increased weight.

In this embodiment, as shown in FIG. 3, the partially cylindrical member 31 has a bellows portion 4 molded into a shape having peaks and valleys each alternating along the optical axis. Thus, the moment of inertia of area I of the partially cylindrical member 31 is increased and the slenderness ratio $\lambda$ is decreased correspondingly, resulting in the enhanced buckling strength and the thinned plate. Consequently, manufacturing cost is decreased and workability is improved due to lightweight members.

Further, for another problem coming from the enlarged housing, it is difficult to ensure flatness of a flange plane of the cover member 30 during manufacture. If the flatness of the flange plate 33 is worsened together with warpage and torsion, a gap is likely to occur against the flange plate 14 of the main body 10, resulting in worsened airtightness. Consequently, interfusion of air or moisture may adversely reduce the laser output. In addition, when correcting the flange plate 33 to ensure flatness thereof during manufacture, manufacturing cost is further increased.

Figure 4:
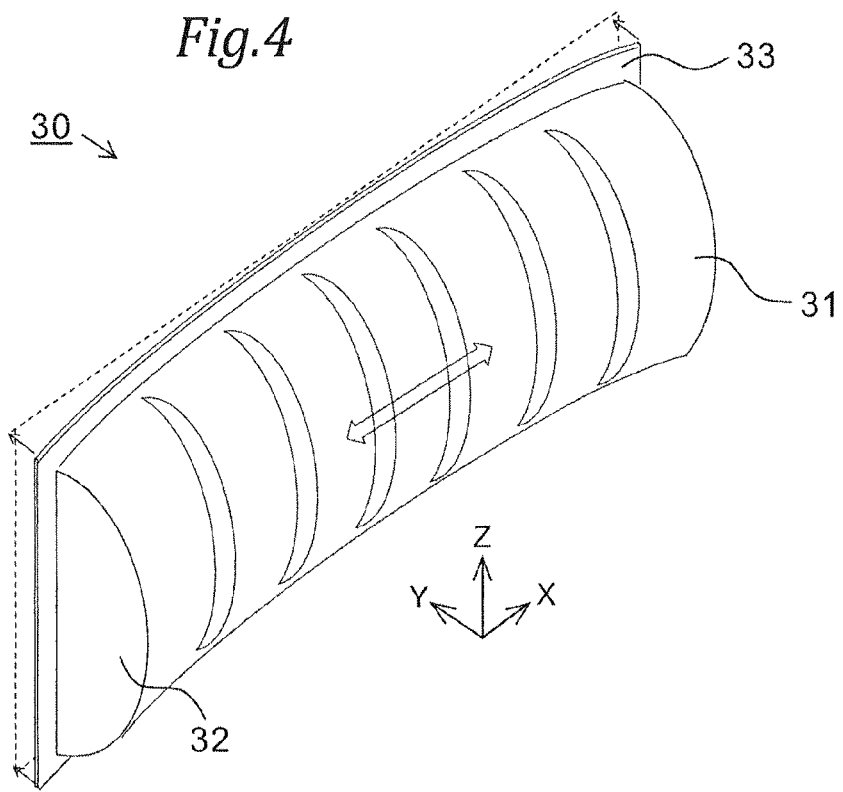
FIG. 4 is a perspective view showing a state where a flange plate is warped along an optical axis.

In this embodiment the partially cylindrical member 31 is provided with the bellows portion 4 having flexibility in X-Y plane. Thus, as shown in FIG. 4, even if the flange plate 33 warps with respect to the optical axis, the bellows portion 4 can deform in a direction of an arrow in FIG. 4 and the flange plate 33 can follow the flange plate 14 of the main body 10, thereby achieving high airtightness. Further, warpage of the flange plate 33 can be tolerated, leading to increased manufacturing yield and decreased manufacturing cost.

Embodiment 2

Figure 5:
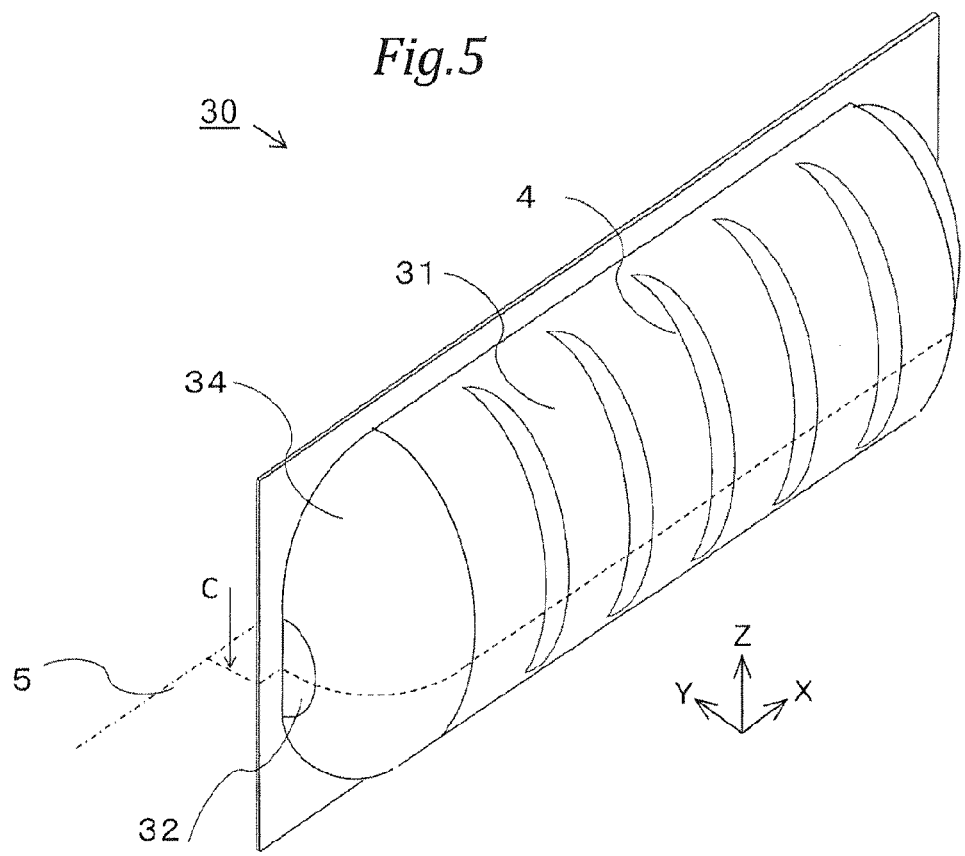
FIG. 5 is a perspective view showing another structure of a cover member according to Embodiment 2 of the present invention.
Figure 6:
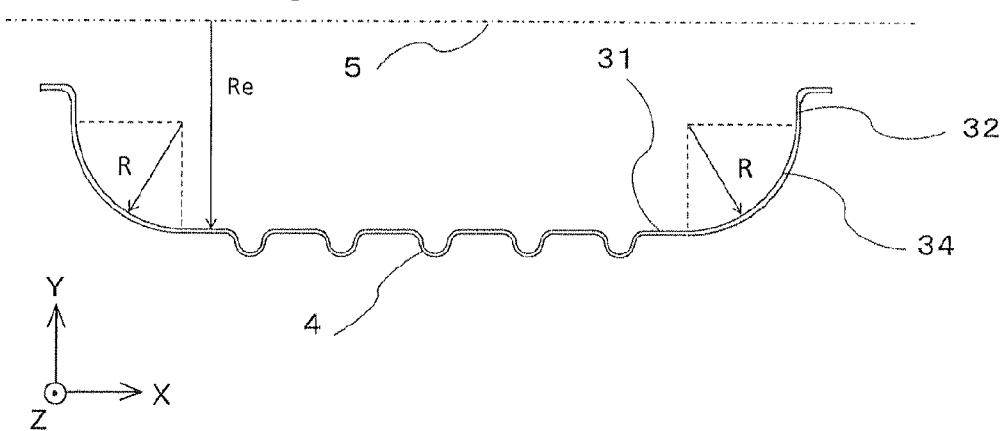
FIG. 6 is a cross sectional view taken by arrow C along X-Y plane passing through a center line of a partially cylindrical member.

FIG. 5 is a perspective view showing another structure of a cover member 30 according to Embodiment 2 of the present invention. FIG. 6 is a cross sectional view taken by arrow C along X-Y plane passing through a center line 5 of a partially cylindrical member 31. Incidentally, since the main body 10 of the housing has the same structure as that of Embodiment 1, redundant description is omitted below.

In this embodiment a side wall member 32 includes a flat portion extending in Y-Z plane and a curved portion 34 molded into an arc-like shape having a radius of curvature R. The partially cylindrical member 31 is connected in a tangential direction of the curved portion.

<Function of Arc-Shaped End>

Since a part of the side wall member 32 is formed as the curved portion 34, the flat portion of the side wall member 32 has a reduced area. Therefore, even when the atmospheric pressure is exerted, a smaller bending stress occurs in the flat portion, thereby the plate thickness of the flat portion can be thinned. In the curved portion 34, even when the atmospheric pressure is exerted, no bending stress occurs, hence, the curved portion 34 can be remarkably thinned and lightweight.

In this embodiment the flat portion is thinned so that the plate thickness of the flat portion is equal to the plate thickness of the cylindrical portion, thereby rendering the plate thickness of the cover member 30 including the flange plate 33 uniform. The uniform plate thickness allows it to be molded by stamping with die from one sheet of plate material, thereby achieving remarkable cost reduction by mass production.

<Omission of Flat Portion End>

Further, the side wall member 32 can be formed only of the curved portion 34 with a larger radius of curvature R to omit the flat portion. In this case even when the atmospheric pressure is exerted, no bending stress occurs, hence, the cover member 30 can be best thinned.

Embodiment 3

Figure 7:
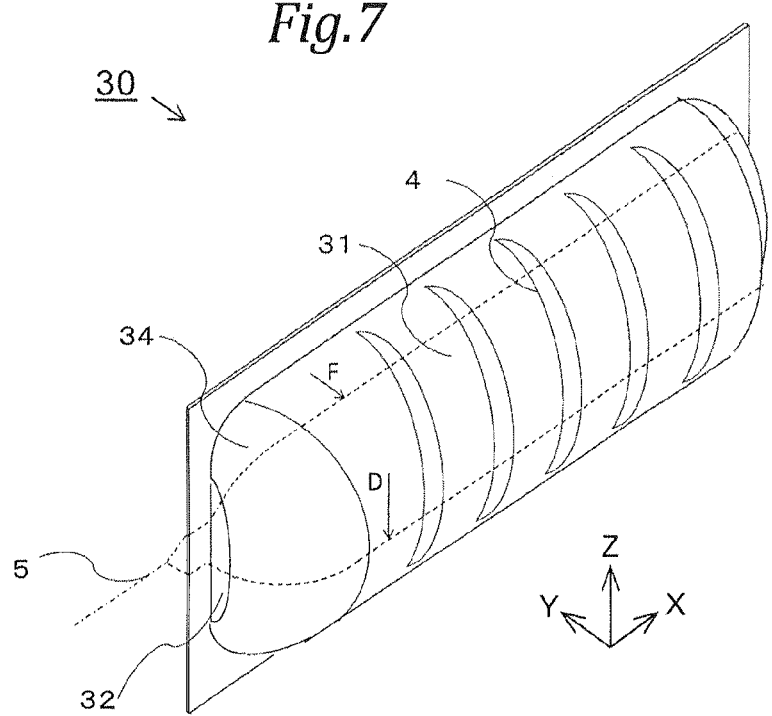
FIG. 7 is a perspective view showing yet another structure of a cover member according to Embodiment 3 of the present invention.

FIG. 7 is a perspective view showing yet another structure of a cover member 30 according to Embodiment 3 of the present invention. FIG. 8A is a cross sectional view taken by arrow F along a plane passing through a center line 5 of a partially cylindrical member 31, and FIG. 8B is a cross sectional view taken by arrow D along X-Y plane passing through the center line 5 of the partially cylindrical member 31. Incidentally, since the main body of the housing has the same structure as that of Embodiment 1, redundant description is omitted below.

In this embodiment the radius of curvature R of the curved portion 34 varies along the circumferential direction of the partially cylindrical member 31. As shown in FIG. 8B, for example, in the cross sectional view taken by arrow D along X-Y plane the curved portion 34 has a radius of curvature Rd, whereas, as shown in FIG. 8A, in the cross sectional view taken by arrow F along a plane which intersects at about 60 degrees with X-Y plane the curved portion 34 has a radius of curvature Rf (<Rd). This structure can bring higher degree of freedom in design of shape of the side wall member 32.

Embodiment 4

FIG. 9 is a cross sectional view taken along X-Y plane passing through a center line 5 of a partially cylindrical member 31, showing yet another structure of a cover member 30 according to Embodiment 4 of the present invention. For comparison the dashed line in FIG. 9 illustrates the shape of the cover member according to Embodiment 2 shown in FIG. 6. As for variables, subscript "0" corresponds to Embodiment 2, and subscript "1" corresponds to this embodiment. Incidentally, since the main body 10 of the housing has the same structure as that of Embodiment 1, redundant description is omitted below.

As for connection P between the partially cylindrical member 31 and the curved portion 34, in Embodiment 2 a radius Rp0 from the center line 5 to the connection $P_0$ is set to be equal to the minimal radius of the partially cylindrical member 31, that is, the radius $R_b$ of the valley of the bellows portion 4. Whereas in this embodiment a radius Rp1 from the center line 5 to the connection $P_1$ is set to be equal to the maximal radius of the partially cylindrical member 31, that is, the radius $R_t$ of the peak of the bellows portion 4. In this case the radius $R_t$ of the valley is larger than the radius $R_b$ of the peak by H.

Next, the function will be described below. The gas duct 24B forms a flow path in which the laser gas can circulate on a plane orthogonal to the optical axis (parallel to the center line 5). In order to reduce pressure loss, the bending radius of the gas flow path is preferably as large as possible, in other words, the gas duct 24B preferably has a maximal radius as long as it does not interfere with the cover member 30. Further, the length of the gas duct 24B along the optical axis is required to be longer than at least the discharge length. In order to have a longer discharge length, the gas duct is required to be longer along the optical axis.

In case of the shape of the cover member according to Embodiment 2, as shown by the dashed line, when the outer radius of the gas duct 24B is set to be approximately the radius $R_b$ of the valley of the bellows portion 4, then the edge portion 25 of the gas duct 24B will interfere with the cover member outside the connection $P_0$. Consequently, the length of the gas duct 24B along the optical axis becomes $LD_0$. Whereas, in case of the shape of the cover member according to this embodiment, as shown by the solid line, even when the outer radius of the gas duct 24B is set to be approximately the radius $R_b$ of the valley of the bellows portion 4, then the edge portion 25 of the gas duct 24B can extend externally beyond the connection $P_0$. Consequently, the length of the gas duct 24B along the optical axis becomes $LD_1$.

Now the lengths $LD_1$ and $LD_2$ of the gas duct 24B will be quantitatively discussed below. In FIG. 9 $L_0$ and $L_1$ are distances from the edge portion 25 of the gas duct 24B to the flat portion of the side wall member 32. For simplification the radius of the gas duct 24B is identical to the radius $R_b$ of the valley of the bellows portion 4, and the edge portion 25 is defined as a position at which the gas duct 24B is in contact with the curved portion 34.

From FIG. 9, the following equations (1) to (3) can be obtained.

$$R_1 = R_0 + H \quad (1)$$

$$R_1^2 = R_0^2 + Y^2 \quad (2)$$

$$R_1 - Y = L_1 \quad (3)$$

Next, Y and $R_1$ can be eliminated using equations (1) to (3), and then $L_1$ can be solved.

$$L_1 = R_0 + H - (2 \cdot H \cdot R_0 + H^2)^{0.5}$$

Next, a difference between $L_0$ (=$R_0$) and $L_1$ can be obtained.

$$L_0 - L_1 = R_0 - L_1 = H((2 \cdot R_0/H + 1)^{0.5} - 1) \quad (4)$$

Here, by using $2 \cdot R_0 > H$, equation (4) can mean $L_0 - L_1 > 0$, which indicates that ($L_0 - L_1$) monotonously increases depending on H.

Therefore, the length $LD_1$ of the gas duct 24B according to this embodiment can be lengthened by equation (4) than the length $LD_2$ of the gas duct 24B according to Embodiment 2. Thus, as H is larger, the gas duct 24B can be further lengthened. Consequently, the discharge length can be lengthened to produce laser light of higher power without modifying dimensions of the laser gas device.

Embodiment 5

Figure 10:
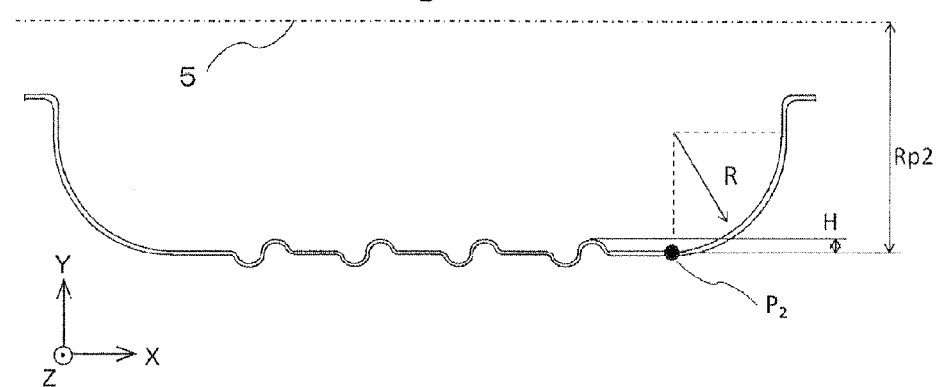
FIG. 10 is a cross sectional view taken along X-Y plane passing through a center line of a partially cylindrical member, showing yet another structure of a cover member according to Embodiment 5 of the present invention.

FIG. 10 is a cross sectional view taken along X-Y plane passing through a center line 5 of a partially cylindrical member 31, showing yet another structure of a cover member 30 according to Embodiment 5 of the present invention. Incidentally, since the main body 10 of the housing has the same structure as that of Embodiment 1, redundant description is omitted below.

In Embodiment 4 as discussed above, the radius Rp1 from the center line 5 to the connection $P_1$ is set to be equal to the radius $R_t$ of the peak of the bellows portion 4. In this embodiment the radius Rp2 from the center line 5 to the connection $P_2$ is set to be larger than the radius $R_b$ of the valley of the bellows portion 4 and smaller than the radius $R_t$ of the peak thereof. In this case the length of the gas duct 24B along the optical axis can be also lengthened than that of Embodiment 2. Consequently, the discharge length can be lengthened to produce laser light of higher power without modifying dimensions of the laser gas device.

INDUSTRIAL APPLICABILITY

The present invention is industrially very useful in that a lightweight and low-cost cover structure can be achieved.

EXPLANATORY NOTE

2 BOLT
3 THROUGH HOLE
4 BELLOWS PORTION
5 CENTER LINE
6 PARTIALLY REFLECTING MIRROR
10 MAIN BODY
11 SIDE PLATE
12 UPPER PLATE
13 LOWER PLATE
14 FLANGE PLATE
15 O-RING GROOVE
16 SCREW HOLE
21A, 21B DISCHARGING ELECTRODE
22B HEAT EXCHANGER
23A, 23B BLOWER
24B GAS DUCT
25 EDGE PORTION
30 COVER MEMBER
31 PARTIALLY CYLINDRICAL MEMBER
32 SIDE WALL MEMBER
33 FLANGE PLATE
34 CURVED PORTION

The invention claimed is:

1. A gas laser device for generating laser light by exciting a laser gas, comprising a housing for enclosing the laser gas,
   wherein the housing includes a main body having a length, which extends along an optical axis of the laser light, and a frame-like structure with openings formed on both sides thereof, the openings extending along a length of an optical axis of the laser light, and a pair of detachable cover members attached to cover each of the openings,
   the main body is provided with a pair of first frame members each extending along the optical axis of the laser light, and a pair of second frame members respectively connecting both ends of the first frame members,
   each of the cover members includes a partially cylindrical member having two opposing ends and an arc-like cross-sectional shape in a plane perpendicular to the optical axis, and each cover member extending along the optical axis, and a pair of side wall members occluding both ends of the partially cylindrical member,
   each side wall member has a curved portion that curves from one of the opposing ends of the partially cylindrical member to an end of the detachable cover member along a portion of the length of the main body, and
   the partially cylindrical member has a bellows portion molded into a shape having peaks and valleys each alternating along the optical axis.

2. The gas laser device according to claim 1, wherein the curved portion is molded into an arc-like shape, and the partially cylindrical member is connected in a tangential direction of the curved portion.

3. The gas laser device according to claim 2, wherein each side wall member is formed only of the curved portion.

4. The gas laser device according to claim 2, wherein the radius of curvature of the curved portion varies along the circumferential direction of the partially cylindrical member.

5. The gas laser device according to claim 2, wherein the radius of an end portion of the partially cylindrical member is larger than the radius of the valley of the bellows portion.

6. The gas laser device according to claim 2, wherein the radius of an end portion of the partially cylindrical member is equal to the radius of the peak of the bellows portion.

7. The gas laser device according to claim 1, wherein each cover member has a uniform thickness.

* * * * *